United States Patent Office 3,001,414
Patented Sept. 26, 1961

3,001,414
ANTI-BACKLASH DEVICES
William Albert Bourne, Kenton, England, assignor to The General Electric Company Limited, London, England
Filed Mar. 11, 1960, Ser. No. 14,238
Claims priority, application Great Britain Mar. 13, 1959
5 Claims. (Cl. 74—441)

This invention relates to anti-backlash devices.

Where there is an imperfect fit between two members which are co-operating to transmit a movement from one of the members to the other then the resulting slack between the members causes backlash. It occurs, for example, where a lead screw works in a threaded nut. Thus, if the lead screw is rotated about its longitudinal axis whilst the nut is prevented from rotating, so that the nut moves lengthwise of the lead screw, and if then the direction of rotation of the lead screw is reversed, the direction of movement of the nut is not immediately reversed. This is due to the slack between the co-operating threads of the lead screw and the nut, this slack being taken up before the nut starts to move in the reverse direction.

Backlash cannot normally be overcome by making the co-operating members a better fit with one another as this increases friction and wear with the result that slack soon appears between the members.

Throughout this specification the term "anti-backlash device" means an arrangement which includes means for overcoming or reducing the slack between co-operating members for the purpose of reducing backlash.

One object of the present invention is to provide an improved anti-backlash device.

According to the present invention an anti-backlash device includes two parts each of which has teeth, threads or the like by means of which it may be arranged to co-operate with teeth, threads or the like on a member, not forming part of the device, for the purpose of transmitting a movement between the device and the member, in operation of the device the two parts being moveable relative to one another for the purpose of increasing or decreasing the slack between the device and the member, the relative movement necessary to increase and/or decrease said slack being brought about by electromagnetic means which forms a part of the device.

An anti-backlash device in accordance with the present invention will now be described by way of example with reference to the accompanying drawing in which.

Figure 1:
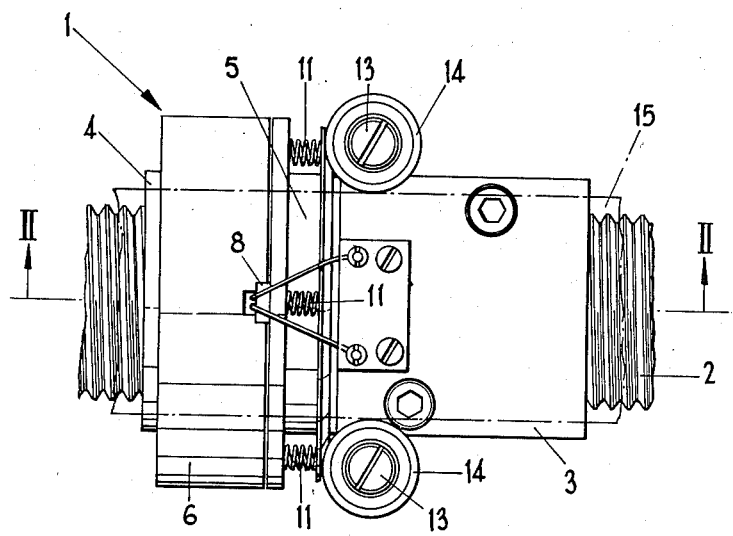
FIGURE 1 shows a plan view of the device.

Referring now to the drawing, the device to be described is an anti-backlash nut 1 which is arranged to co-operate with a lead screw 2 such that when the lead screw 2 is rotated about its longitudinal axis whilst the nut 1 is prevented from rotating, the nut 1 moves lengthwise of the lead screw 2.

The nut 1 includes first and second parts 3 and 4 each of which is internally threaded to co-operate with the lead screw 2, the parts 3 and 4 being formed of bronze which may, for example, be aluminium bronze or phosphor bronze. The outside diameter of the part 3 is reduced over a portion of its length at the end which, in the assembled device, will be adjacent the part 4. This portion carries a collar 5 which is a sliding fit thereon, the collar 5 being formed of soft iron.

The part 4 of the nut 1 has a collar 6, also formed of soft iron, rigidly attached to it, the cross-section of the collar 6 being in the form of a letter U lying with its open end towards the part 3 of the nut 1. The collar 6 accommodates an annular solenoid 7 in the space between the arms of the U. Attached to the open end of the collar 6 are four symmetrically disposed brass bridging pieces 8 each of which bridges the gap between the arms of the U and each of which has a recess 9 on the face remote from the solenoid 7.

The cross-section of the collar 5 is also generally in the form of a letter U, with its open end directed away from the lead screw 2. The arm of the U adjacent the bridging pieces 8 is pierced by four symmetrically disposed holes 10 through which pass four helical springs 11 respectively, which each lie with their length parallel to the length of the lead screw 2. One end of each of the springs 11 bears on the inside face of the collar 5 remote from the bridging pieces 8, whilst the other ends rest on the four recesses 9 respectively.

The dimensions of the parts of the device are such that there is normally a small gap between the opposing surfaces of the collar 5 and the bridging pieces 8 and a slightly larger gap between the opposing surfaces of the parts 3 and 4 of the nut 1. The springs 11 are such that when the solenoid 7 is not energised they tend to push the bridging pieces 8 and the collar 5 apart, the collar 5 then co-operating with a shoulder 12 on the part 3 so that the parts 3 and 4 of the nut 1 are pushed apart. Thus one part 3 or 4 is pushing against the threads of the lead screw 2 in one direction and the other part 4 or 3 is pushing against the threads of the lead screw 2 in the other direction so that in effect the slack between the nut 1 and the lead screw 2 is reduced.

Figure 2:
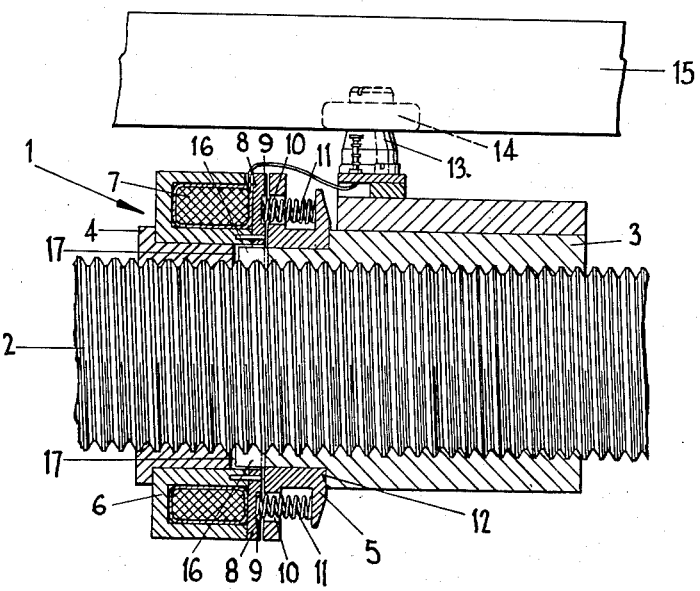
FIGURE 2 shows a section on the line II—II of FIGURE 1 as seen in the direction of the arrows.

The part 3 includes two projecting members 13 each of which carries a roller 14 which, when the device is in use, bear on two opposite faces of a rectangular bar 15 (FIGURE 2) arranged with its length parallel to the length of the lead screw 2 and spaced at a short distance from it. In operation, when the lead screw 2 is rotated one or other of the rollers 14 bears on the bar 15, preventing rotation of the part 3. The part 3 is provided with two projections 16 (FIGURE 2) which co-operate with recesses 17 (FIGURE 2) in the part 4 so that the part 4 is not able to rotate relative to the part 3. When the lead screw 2 is rotated, therefore, the nut 1 is caused to move longitudinally of the lead screw 2.

When it is desired to move the nut 1 rapidly and easily relative to the lead screw 2 the solenoid 7 is energised so that a magnetic flux is set up embracing parts of the collars 5 and 6 and the bridging pieces 8. This has the effect of drawing the collar 5 and the bridging pieces 8 together against the resistance of the springs 11 so that the force urging the parts 3 and 4 against the threads of the lead screw 2 is overcome. If the lead screw 2 is now rotated the parts 3 and 4 will automatically take up the spacing from one another which results in the least possible resistance to movement.

The nut 1 described could be modified to work the other way round, that is to say, the slack could be taken up by urging the parts 3 and 4 towards one another. Alternatively, in either of the foregoing cases the arrangement could be such that the backlash is taken up when the solenoid 7 is energised. In addition, the springs 11 may be dispensed with and the desired thrust brought about by the interaction of two solenoids, such as the solenoid 7, arranged to attract or repel one another.

I claim:

1. An anti-backlash device, which is adapted to cooperate with a threaded member, said device including two parts each of which has threads adapted to cooperate with the threads on said member for the purpose of transmitting a movement between said device and said member, the two parts of said device being movable relative to one another during operation for the purpose of varying the slack between said device and said member, said device also including electromagnetic means the energization of which causes relative movement between said parts so that the slack between said device and said member is thereby varied.

2. An anti-backlash device according to claim 1 wherein the electromagnetic means is a solenoid which is incorporated in one of the parts of said device, the relative movement necessary to vary the slack between said device and the member being caused by magnetic forces acting between said solenoid and a portion of the other part of said device.

3. An anti-backlash device according to claim 2 wherein spring means are arranged normally to urge the two parts of said device relative to one another so as to decrease the slack between said device and the member, and said solenoid when energized is arranged to oppose the spring means so that the slack between said device and said member is increased.

4. A variable backlash arrangement comprising a device which includes two internally threaded parts, and a threaded screw with which said parts cooperate, said device also including spring means arranged to urge said parts relative to one another such that the slack between said parts and said member is taken up in one sense for one of said parts and in the other sense for the other of said parts so that the backlash between said device and said member is thereby substantially reduced, solenoid means incorporated in one of said parts, and means to energize said solenoid means, said solenoid means being so disposed that when energized magnetic forces are set up opposing said spring means and the slack between said parts and said member is no longer taken up as aforesaid.

5. An anti-backlish device comprising two nuts adapted to cooperate with a threaded shaft, resilient means to urge the two nuts apart for the purpose of reducing backlash between said device and said shaft, an electromagnet secured to one of said nuts, means to energize said electromagnet so as to set up magnetic forces which tend to draw said nuts together against the action of said resilient means, and the means to limit the extent to which said nuts may be drawn together as aforesaid whereby the backlash between said device and said member is restored to a normal value when said electromagnet is energized.

References Cited in the file of this patent

UNITED STATES PATENTS

| | | |
|---|---|---|
| 2,119,705 | De Vlieg | June 7, 1938 |
| 2,192,188 | Green | Mar. 5, 1940 |
| 2,690,682 | Passman | Oct. 5, 1954 |
| 2,916,931 | Cunningham | Dec. 15, 1959 |
| 2,919,596 | Kuehl | June 5, 1960 |